> United States Patent [19]
Hubert

[11] Patent Number: 4,492,548
[45] Date of Patent: Jan. 8, 1985

[54] MACHINERY FOR MOLDING HEADPIECE FOR COLLAPSIBLE TUBE INCLUDING A CHILLED WIPER

[75] Inventor: Warren N. Hubert, Ducanville, Tex.

[73] Assignee: RJR Archer, Inc., Winston-Salem, N.C.

[21] Appl. No.: 326,325

[22] Filed: Dec. 1, 1981

Related U.S. Application Data

[63] Continuation-in-part of Ser. No. 121,827, Feb. 15, 1980, abandoned, which is a continuation-in-part of Ser. No. 72,104, Sep. 4, 1979, abandoned.

[51] Int. Cl.³ ............................................. B29F 3/08
[52] U.S. Cl. .................................... 425/113; 264/260; 264/268; 425/114; 425/120; 425/125; 425/132; 425/133.1; 425/308; 425/325; 425/378 R; 425/523; 425/531; 425/532
[58] Field of Search ............... 425/113, 308, 132, 531, 425/133.1, 125, 120, 129 R, 532, 523, 296–298, 381, 466, 378 R, 114; 264/268, 260

[56] References Cited

U.S. PATENT DOCUMENTS

| | | | |
|---|---|---|---|
| 2,812,548 | 11/1957 | Quinche et al. | 425/125 |
| 2,883,706 | 4/1959 | Quinche et al. | 425/125 |
| 3,244,788 | 4/1966 | Michel et al. | 425/129 R |
| 3,260,411 | 7/1966 | Dobson | 222/107 |
| 3,313,875 | 4/1967 | Magerle | 425/129 R |
| 3,330,006 | 7/1967 | Jenkins | 425/125 |
| 3,452,687 | 7/1969 | Kaneko et al. | 425/298 |
| 3,457,337 | 7/1969 | Turner | 425/532 |
| 3,565,293 | 2/1971 | Schultz | 222/107 |
| 3,874,834 | 4/1975 | Arechaval et al. | 425/132 |
| 4,185,757 | 1/1980 | Schultz | 222/107 |

Primary Examiner—Jeffery Thurlow
Attorney, Agent, or Firm—Joseph E. Root, III

[57] ABSTRACT

A headpiece for a collapsible tube is a unitary member made up of two different plastics, each plastic providing a different property for the headpiece. The headpiece is formed by extruding on top of one another a first torus like annulus of a first plastic and a second torus like annulus of a second plastic. The two plastic annuli are simultaneously molded to form the headpiece. One plastic forms, primarily, the outer portion of the headpiece and the other plastic forms, primarily, the inner portion of the headpiece.

The machine for molding the plastic head includes a work table rotatably indexed from station to station at which various operations are performed. The mandrel which holds the cylindrical body, to which the head is molded, is movable from an inboard position to an outboard position so that operations can be performed relative to it. The molding operation is performed at the inboard position. The loading, extruding, capping and ejection operations are performed at the outboard position. The nozzle of the plastic extruder includes a chilled wiper for wiping an extruded plastic annulus into the mold cavity.

5 Claims, 16 Drawing Figures

MACHINERY FOR MOLDING HEADPIECE FOR COLLAPSIBLE TUBE INCLUDING A CHILLED WIPER

RELATED APPLICATION

This application is a continuation-in-part of Ser. No. 121,827, filed Feb. 15, 1980, now abandoned, which is a continuation-in-part of abandoned application Ser. No. 072,104 filed Sept. 4, 1979 and titled Headpiece For Collapsible Tube.

BACKGROUND OF THE INVENTION

Collapsible tubes are well known in the art. They are used, for example, as dispensers for toothpaste and shampoo. They are also commonly referred to as squeeze tubes. In forming a collapsible tube of this type, the body or sidewall portion is formed separately from the headpiece portion. The headpiece, generally, is molded to the formed sidewall portion.

One commonly employed sidewall is a multi-ply, collapsible sheet material having inner and outer plastic plies, usually polyethylene, and an inner metal foil ply, usually aluminum. The aluminum acts as a barrier to oxygen penetration and flavorant migration. The polyethylene protects the aluminum from the contents of the tube, provides a convenient printing surface and affects the feel of the tube to the end user. The aluminum and polyethylene are combined in amounts that provide a desired collapsibility and avoidance of spring back. All of this is known in art and will not be gone into further herein because the structure of the sidewall does not form a part of this invention except that the headpiece must be bondable to the sidewall.

The headpiece of the tube provides a number of functions. Because it forms one end of the collapsible tube, it, obviously, must have a degree of structural integrity to prevent collapse in use. In addition, it must be formed of a material which, like the materials in the sidewall, prevents migration of the substance of the contents or deterioration of the contents. Further, the material of the headpiece has to be bonded to the plastic material of the sidewall and it must resist corrosion from the contents of the tube as well as avoid chemically reacting with the contents of the tube. Where the tube contents are such that these functions cannot be provided by the same plastic material, the prior art has attempted to provide other solutions. For example, as shown in U.S. Pat. No. 3,260,411, a barrier member is provided within the headpiece, adjacent the contents of the tube. This prevents the migration or deterioration of the substances held within the tube.

However, the cost of separately forming and inserting this barrier member is high, so that its use is uneconomic. Further, there is a problem in holding the barrier member to the rest of the tube.

It is an object of the present invention to provide a headpiece which allows both the structural integrity and the protection of the contents without the necessity for an additional insert.

It is a further object of the present invention to provide a method for forming an integral headpiece of two plastic materials in an expeditious and efficient manner.

It is a still further object to provide an extrusion die for use in forming an integral headpiece of two thermoplastic materials.

Because of the very high volume with which these tubes are used, any saving in the cost per tube will amount to a significant total figure. Furthermore, the cost of the tube is often an appreciable fraction of the cost of the goods contained therein and thus it is important that the cost of the tube be minimized. One of the key considerations in keeping the cost of the tube to a minimum is to fabricate the tube on a high speed machine whose design is sufficiently simple and trouble free so that there is minimum downtime for repairs and adjustments.

Accordingly, it is a further purpose of this invention to provide equipment which will mold a headpiece onto a cylindrical sidewall, which equipment is capable of high speed operation with minimum downtime for repairs and adjustments.

Related to this purpose is the object of providing headpiece molding machinery which has a minimum of moving parts and in which complex movements are avoided as much as possible.

BRIEF DESCRIPTION

The Headpiece

An integral plastic headpiece for a collapsible squeeze tube has two plastic portions. One of the two plastics is compatible with bonding the headpiece to the plastic ply of the collapsible sidewall of the squeeze tube. The other plastic is selected to prevent deterioration or migration of the substances contained within the collapsible tube.

The Molding Technique

This dual-plastic integral headpiece is achieved by extruding a first plastic annulus and a second plastic annulus, each of which have a torus type of shape, in succession, on top of one another from a single extruder die. This dual annulus structure is wiped from the extruder onto a lower mold piece which mold piece has a configuration that defines the inner surface of the headpiece to be formed. An upper mold piece defining the outer surface of the headpiece to be formed is brought into engagement with the lower mold piece to force the two annuli into the shape of the desired headpiece. Concurrently the sidewall is supported around the lower mold piece so that the upper edge of the sidewall comes into contact with the plastic annuli and is bonded thereto.

The terms "inner mold piece" and "lower mold piece" are used herein interchangeably to refer to the same part. Similarly, the terms "outer mold piece" and "upper mold piece" are used to refer to the same part.

During this essentially transfer molding technique, the lower annulus becomes an inner portion of the headpiece while the upper annulus becomes the outer portion of the headpiece. The upper annulus thus must be of a plastic material compatible with bonding to the plastic ply of the sidewall while the lower annulus must be of a plastic material compatible with the ingredients of the tube and tending to serve the functions of preventing deterioration or migration of the substances within the tube.

Variations in the relative amounts of the plastics in the upper and lower annuli can affect the extent to which, for example, the plastic forming the inner portion of the headpiece can also be used to form or define a portion of the neck and threads of the headpiece.

The Molding Equipment

A chilled hollow wiper around the extrusion nozzle wipes the extruded plastic annuli off the nozzle so that the plastic will drop onto the lower or inner mold piece. The lower mold piece is the upper portion of a vertically deployed mandrel. There are ten mandrels with their associated mold pieces arranged on a rotating work table for intermittent rotational motion between various work stations. Each mandrel, although it remains with its axis vertical at each work station, moves between an inboard position on the work table and an outboard position on the work table. The axis of each mandrel remains vertical and parallel to the vertical axis of the work table as the mandrel moves between inboard and outboard positions. At work stations where the extruder die is positioned, the corresponding mandrel is outboard. After the plastic dual annulus has been wiped off the nozzle and dropped into the lower mold piece, the mandrel pivots to an inboard position to be stepped through a molding station and various cooling stations.

At the molding station, the mandrel and lower mold piece are positioned below the upper mold piece. The upper mold piece is then brought down to mold the head onto the upper end of the tube sidewall. A chilled jacket in the upper mold piece is configured to cool both the threaded neck and the shoulder area of the molded head thereby increasing the speed of operation.

The lower mold piece has a series of indentations which result in corresponding small protrusions along the inner surface of the molded head. As a consequence, after the upper mold piece is removed, the molded tube is held in place on the lower mold piece against rotational movement and thus a cap can be readily screwed in place at a capping station. A holding and seating mechanism mounted on the mandrel near the lower end of the tube sidewall positions and holds the sidewall during the molding operation.

BRIEF DESCRIPTION OF THE DRAWINGS

FIG. 1 is in part an elevation view and in part a longitudinal sectional view of the headpiece.

FIG. 3 illustrates the two annuli formed on the end of the extruder die and positioned immediately above the mold piece employed to define the inner surface of the plastic headpiece.

FIG. 7 illustrates the two plastic annuli in a condition corresponding to that of FIG. 4. FIG. 8 illustrates the annuli immediately after the inner mold part has contacted the two annuli. FIG. 9 illustrates a further stage in the molding where the two mold parts have partially come together. FIG. 10 illustrates the final stage of the molding when the two mold parts have completed their progression toward one another.

FIG. 13 also illustrates the position of the extruder at the extruder station and schematically indicates the track on which the mandrel moves between an outboard and an inboard position.

DESCRIPTION OF THE PREFERRED EMBODIMENTS

Figures 1, 2, 3:
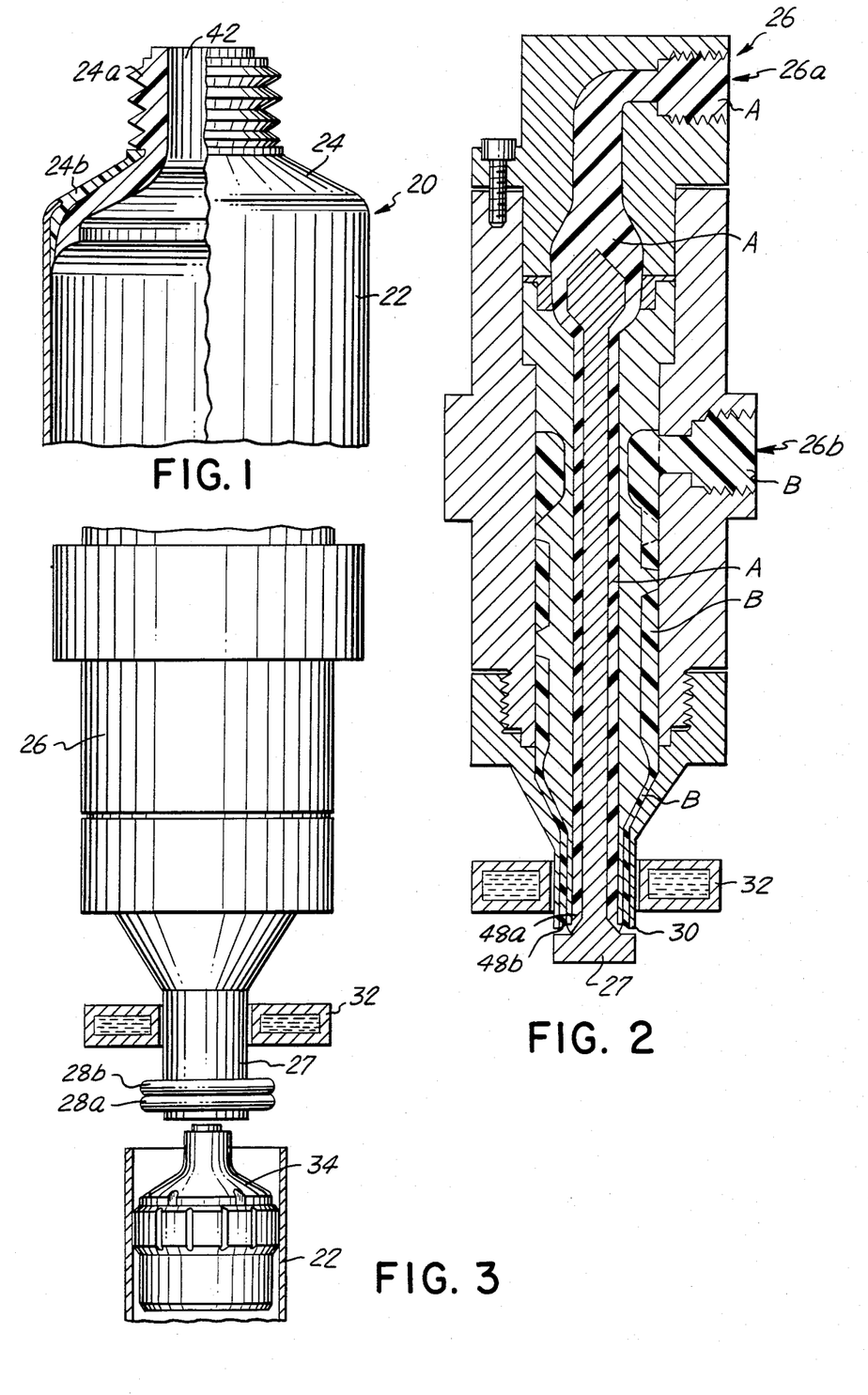
FIG. 1 is a view of the top portion of a collapsible squeeze tube having a headpiece according to the present invention.
FIG. 2 is a longitudinal sectional view of the extruder die employed to form the two annuli which are the starting points for molding the plastic headpiece of this invention, such as the headpiece shown in FIG. 1.
FIG. 3 is a schematic illustration of a first stage in the molding of the FIG. 1 headpiece.

FIG. 1 illustrates a collapsible tube 20 having a cylindrical sidewall portion 22 and a plastic headpiece portion 24. The collapsible wall portion 22 is formed from one of the flexible web materials known in the art such as a multi-ply web having outer polyethylene plies and a center aluminum ply.

The headpiece portion 24 has an inner plastic portion 24a and an outer plastic portion 24b. The two portions together form a unitary headpiece 24. The headpiece 24 is bonded to the wall 22 by plastic adhesion of the outer plastic 24b of the headpiece 24 to the inner plastic ply of the wall 22. That bonding is accomplished during molding of the headpiece. Further, if desired, the headpiece 24 can be bonded to the wall 22 by other standard adhesion methods, such as by adhesive bonding.

The material of the outer plastic 24b is selected to be bondable with the inner plastic ply of the wall 22. Most tube walls 22 presently employed in the art have outer and inner polyethylene plastic plies. Therefore, the outer plastic 24b of the headpiece 24 is preferably formed of polyethylene. However, should the composition of the inner plastic ply of the wall 22 be different, the outer plastic 24b of the headpiece can be varied accordingly.

The inner plastic 24a must be compatible with the contents of the tube and, in many cases, must act to prevent deterioration of those contents; for example, by preventing oxygen penetration. In cases where the inner plastic 24a must be hygroscopic, it can be formed of any of the standard polyamide materials generally sold under the name nylon. Though nylon is particularly useful when it is important that the inner plastic 24a be hygroscopic, nylon has disadvantages. In particular, a higher temperature is required to effect molding of the nylon so that, other factors being equal, greater cooling is also required after formation of the headpiece. Thus, slower processing is experienced employing nylon as the inner plastic 24a.

Other materials which can be employed in forming the inner plastic 24a are ionomers, such as those sold by duPont under the trademark Surlyn. At present, polypropylene is the preferred material for the inner plastic 24a for the combined reasons of cost, effectiveness, and speed of manufacture.

The examples just given for the material of the inner plastic 24a, i.e., polypropylene, polyamide and ionomers, are the presently preferred types of materials for the inner plastic 24a when the outer plastic 24b is formed of polyethlyene. If the composition of the outer plastic 24b is varied, the composition of the inner plastic may have to be varied, so as to be compatible with the material of the outer plastic, while still retaining the necessary properties for the inner plastic.

Because of the method of forming this headpiece, it is a unitary structure consisting of plastic 24b compatible with bonding to a plastic ply of the sidewall 22 and plastic 24a providing protection for the product contained in the tube. Thus it is not necessary to insert a barrier member into the headpiece to provide any additional properties.

FIGS. 2 and 3 show the extruder 26 for coextrusion of the two plastics into the composite extrusion which is then molded to form the integral headpiece 24 of the present invention. The plastic A, which forms the lower annulus 28a and thus the inner portion 24a of the integral headpiece, is fed to the extruder 26 through inlet 26a as indicated by the arrow in FIG. 2. The plastic B, which forms the upper annulus 28b, and thus the outer layer 24b of the integral headpiece, is fed to the extruder 26 at inlet 26b, as indicated by the arrow in FIG. 2.

The thermoplastic material A fed at inlet 26a follows a path in the extruder generally designated by the reference designation A to exit at the port 30 in the nozzle 27. The thermoplastic material B enters the die at inlet 26b and follows the path B to exit the same nozzle port 30. The extrusion sequence in the extruder 26 assures that the plastic A is extruded first so as to form a lower annulus 28a and that plastic B is extruded immediately thereafter to form the upper annulus 28b.

An axially movable water cooled wiper 32 in the form of an annulus around the nozzle 27 of the extruder 26 is used to wipe the plastic annuli 28a, 28b, off the nozzle 27. After the two plastic annuli 28a, 28b have been extruded from the outlet nozzle 30 of the extruder 26, these two annuli 28a, 28b will be sitting on the lower end of the nozzle 27. As soon as the two hot plastic annuli 28a and 28b have been formed, the water cooled wiper 32, is brought axially downward to wipe the two annuli off the nozzle 27 and cause them to drop onto a lower mold piece 34, (see FIG. 4). This lower mold piece 34 is carried as the top portion of a vertically oriented mandrel 62 (see FIG. 14) which is indexed from work station to work station.

The clearance relationship between the nozzle 27 and wiper 32 must be sufficiently great so that metal to metal contact is substantially avoided and sufficiently small so that all of the extruded plastic is wiped off the nozzle 27. A wiper 32 having an inside diameter which is between about 0.075 and 0.1 mm (3 to 4 mils) greater than the diameter of the nozzle 27 has been found to provide useful clearance to achieve both of these objectives.

The lower mold piece 34 is configured to define the inner surface of the headpiece to be molded and thus is also designated herein as the inner mold piece. The sidewall 22 is held by light friction fit on an adapter sleeve 66 and thus positioned around the inner mold piece 34 extending up into the area adjacent to where the hot plastic annuli falls so as to assure that contact will be made between the inner plastic ply of the sidewall 22 and the hot plastic of the annuli thereby causing the desired adhesion of headpiece to sidewall. The wiper 32 is water cooled in order to avoid having the hot plastic of the annuli stick to the wiper during the wiping operation.

Figure 4:
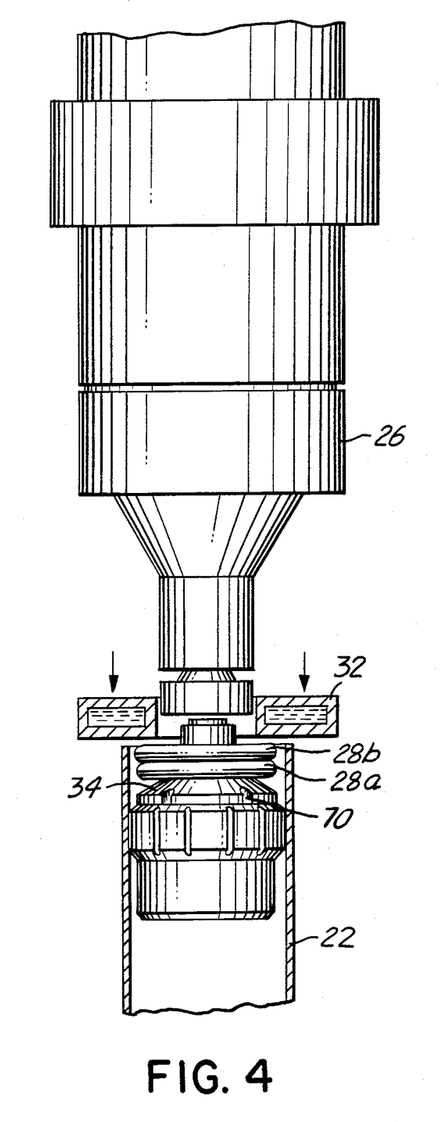
FIG. 4 is a view similar to FIG. 3 showing the next stage in the operation in which a chilled wiper plate has pushed the two annuli off the die piece and dropped them onto the inner mold piece.
Figure 5:
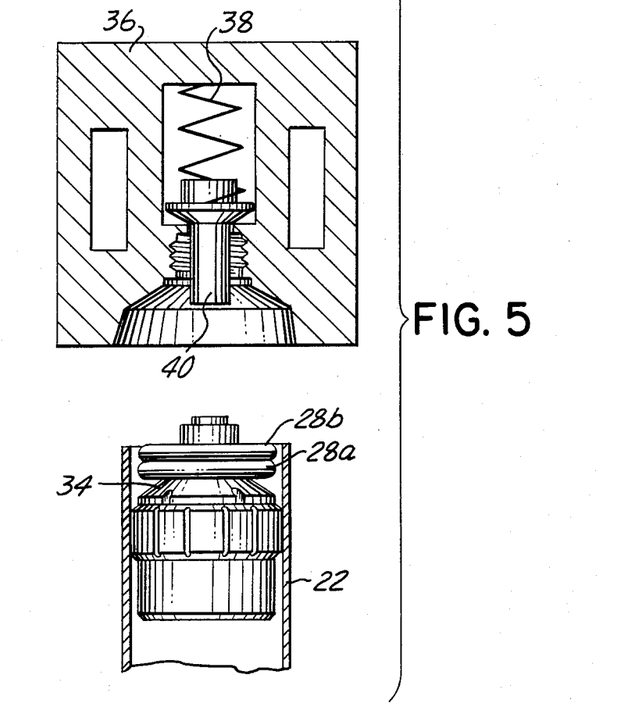
FIG. 5 shows the inner mold piece carrying the two plastic annuli indexed over to a position under and in alignment with the outer mold piece which defines the outer surface of the headpiece to be molded.

After the annuli have dropped onto the inner mold piece 34 shown in FIG. 4, the inner mold piece 34 is indexed to a position under and in alignment with an upper mold piece 36 as shown in FIG. 5. This upper mold piece 36 has a surface configured to define the outer surface of the headpiece and thus is also designated herein as the outer mold piece. This outer mold piece 36 includes a spring 38 loaded pin 40 that extends down into the cavity defined by the outer mold piece 36.

Figure 6:
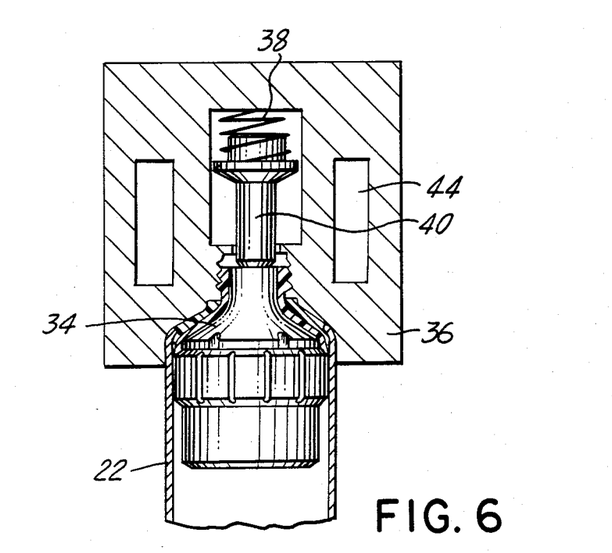
FIG. 6 is a view similar to that of FIG. 5 showing the outer mold piece having engaged the inner mold piece to define the mold cavity which forms the plastic headpiece from the two plastic annuli.

After the two mold pieces 34 and 36 have been brought into the alignment shown in FIG. 5, they are brought together, as shown in FIG. 6, into engagement thereby defining a cavity in which the headpiece is molded by this process of transfer molding. The pin 40 abuts against the upped edge of the inner mold piece 34 and is held tightly against this inner mold piece 34 by the spring 38 so as to assure that the plastic material being molded does not block the passage way 42 required through the headpiece 24.

As the outer mold piece 36 descends, it contacts the upper edge of the tube sidewall 22 and pushes the side wall 22 down until the lower end of the sidewall 22 is engaged by the three O-rings 66 on the mandrel 62 (see FIG. 14) which then hold and position the sidewall 22 in proper relation to the mold cavity within which the head is being formed. The downward movement of the sidewall 22 is stopped by a ledge 67 just prior to the completion of the downward movement of the outer mold piece 36. Thus, as shown in FIG. 6, a small segment of the sidewall 22, of about 0.8 mm, is forced inward to assure a smooth transition between the sidewall 22 and head 24 and to assure that the upper edge of the sidewall 22 is covered by the plastic of the head.

An adapter sleeve 68 on the mandrel 62 engages the sidewall 22 with a slip fit relationship to position the sidewall 22 so that the mandrel 62 axis is centered in the sidewall 22.

As can be seen in FIG. 6, the mold cavity although primarily defined by the two major mold pieces 34 and 36 is also, in part, defined by the lower rim of the pin 40 and by the upper portion of the sidewall 22.

Figure 14:
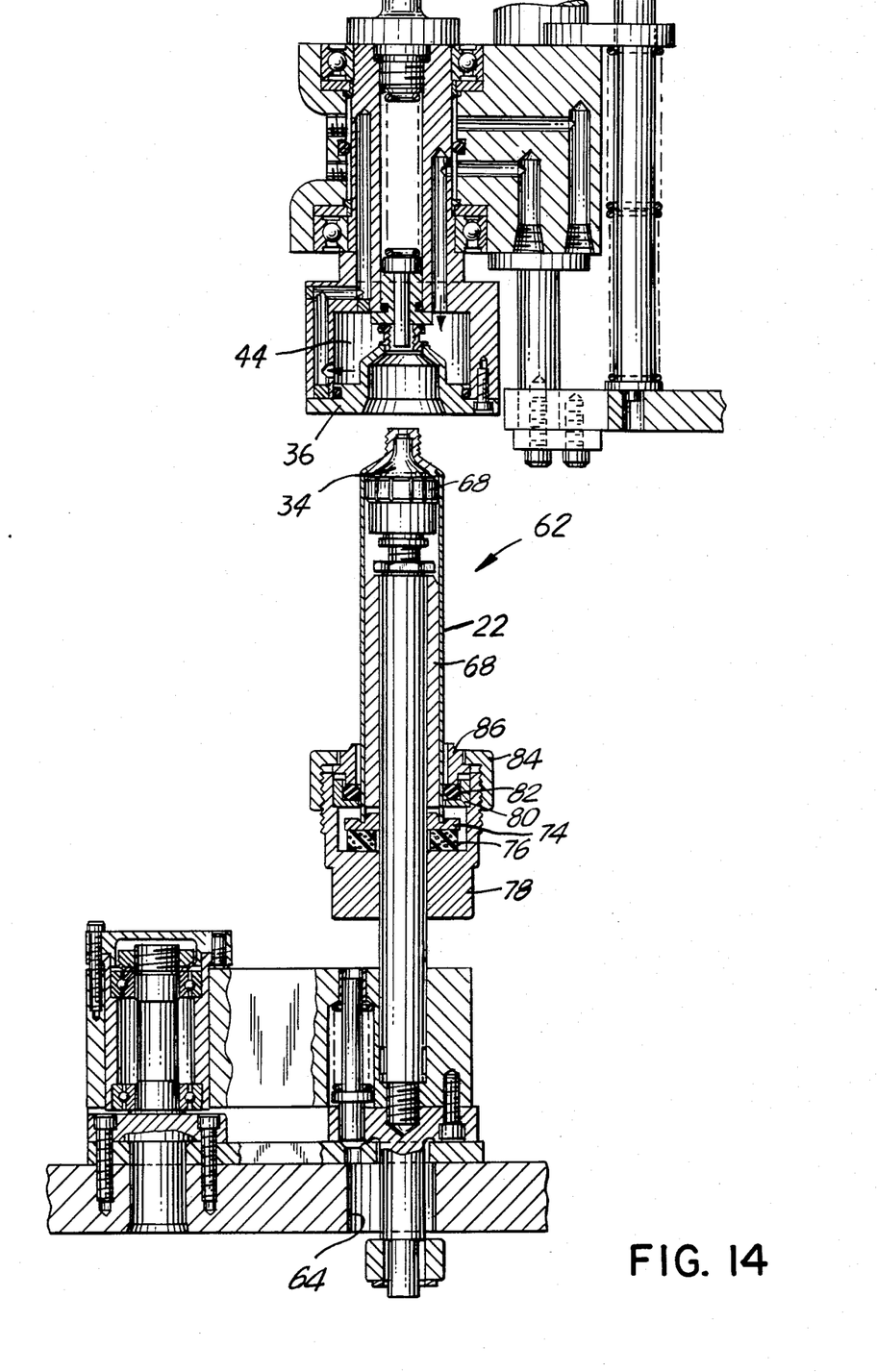
FIG. 14 is a sectional view along the line 14—14 of FIG. 13 and includes a more detailed showing of the upper and lower mold pieces and the mandrel than is illustrated in the more schematic FIGS. 5 and 6.

The mold is cooled by passing ethylene glycol at about minus ten (−10)°C. through the chamber 44 to cool and solidify the plastic materials A and B that form the molded head 24. As shown in FIG. 14, the chamber 44 is configured to encompass the neck and shoulder portions of the upper mold 36 to effect cooling over the entire outer surface of the head being molded, including the thread portions.

After formation of the headpiece in the mold as described, the tube now having a formed headpiece, is indexed to other work stations for cooling, removal of the outer mold piece, capping and ejection.

Figure 7:
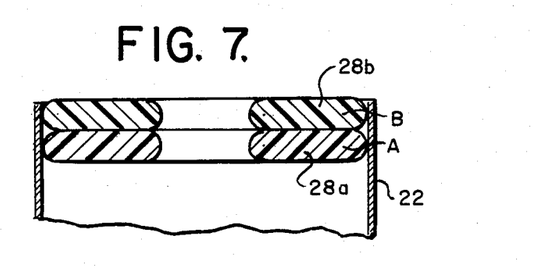
FIGS. 7 through 10 show the progressive forming of the headpiece as the tube mold parts come together. These four FIGS. are in simplified schematic form and illustrate the annuli in cross section. More specifically.
Figure 8:
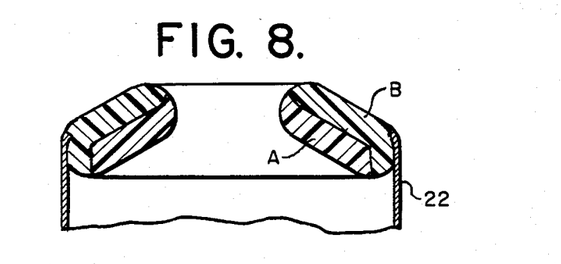
Figure 9:
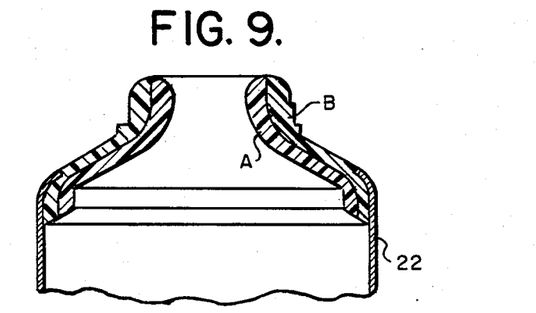
Figure 10:
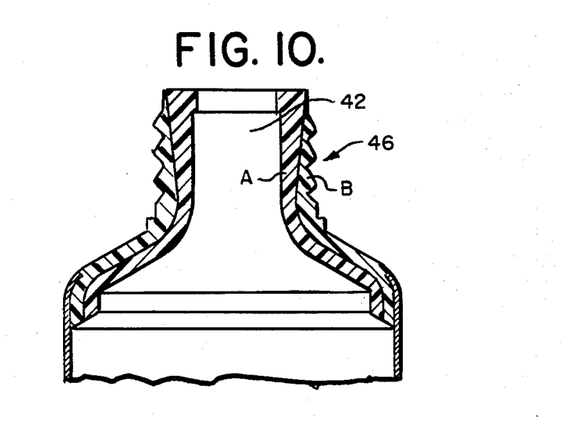

FIGS. 7 through 10 illustrate in somewhat idealized form the configuration of the plastic materials A and B during the process of molding the finished headpiece 24 from the composite annulus structure 28a, 28b. FIG. 7 illustrates the composite extrusion of plastics A and B on their formation as they are dropped from the nozzle 27 onto the inner mold piece 34. As soon as these hot, fluid, plastic materials A and B contact the surface of the inner mold piece 34, they tend to assume the shape shown in FIG. 8. Upon further movement of the two mold parts 34 and 36 together, the plastics A and B form the configuration illustrated in FIG. 9 in which it can be seen that the lower annulus 28a has begun to form the inner plastic portion A and the upper annulus 28b has begun to form the outer plastic portion B. The completion of bringing together the two mold pieces 34 and 36 provides the end result as shown in FIG. 10; namely a headpiece 46 having integral plastic portions A and B.

The headpiece 46 shown in FIG. 10 differs from the headpiece 24 shown in FIG. 1 in that the proportion of the two plastics A and B are different. More particularly, FIG. 10 represents a situation where there is relatively more of the plastic B than is the case in FIG. 1.

Figure 11:
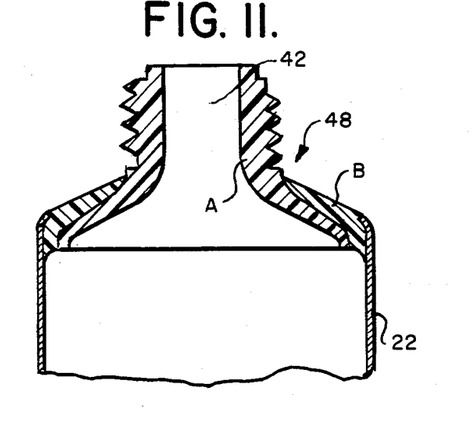
FIG. 11 is a cross sectional view showing a second embodiment of the headpiece in which substantially less of the plastic of the upper annulus and substantially more of the plastic of the lower annulus is employed than is represented by the embodiment shown in FIGS. 7 through 10.
Figure 12:
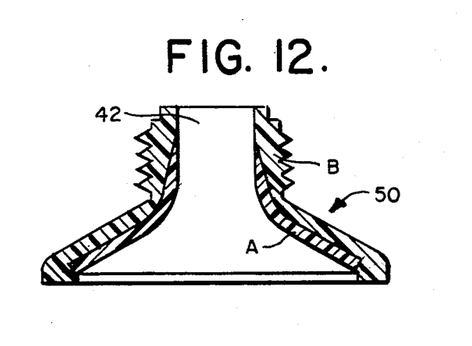
FIG. 12 illustrates a still further embodiment of this invention in which the amount of plastic employed in the upper annulus and the lower annulus are intermediate between the amounts employed to manufacture the headpieces in FIG. 10 and FIG. 11.

Further headpiece configurations 48 and 50 are shown in FIGS. 11 and 12 in which different amounts of the plastics A and B have been employed. The differences in the various headpieces shown herein 24, 46, 48 and 50 are not due to different methods of formation but are rather due to the relative amounts of plastic materials A and B employed for forming the upper and lower annuli 28b and 28a. Thus, for a configuration of a headpiece shown in FIG. 11, the annulus 28a has to be substantially thicker than the annulus 28b whereas in the configuration shown in FIG. 10, the relative sizes of the annuli 28a and 28b are much more similar.

It is important that the outer part of the shoulder portion of the headpiece be of the plastic B which is adapted to bond to the plastic ply of the sidewall 22. Depending upon the materials involved, their relative costs and the application, the neck portion of the headpiece may be formed primarily of the inner plastic material A with little or no covering of the plastic material B (as in FIG. 10) or primarily of the outer plastic B (as in FIG. 12).

The change in relative amounts of the two plastics A and B is accomplished by varying the pressure on and/or timing of the plastics fed at inlets 26a or 26b to vary the relative amounts of the two plastics extruded at the exit port 30.

In each case, the outer peripheral lower edge portion of the headpiece is composed of the B plastic in order to bond to the inner plastic ply of the tube sidewall 22. In each case, the A plastic extends over the entire inner wall of the headpiece to assure that the entire headpiece is impermeable.

The composite extrustion 28a, 28b can be formed by first extruding one of the plastics A through the annular outlet 48a and annular exit port 30 as an annulus followed by extrusion of the second plastic B through the annular outlet 48b and exit port 30 as a second annulus. A slightly different extruder configuration would permit extrusion of the two annuli simultaneously. in any case, the composite dual annulus 28a, 28b is extruded on the nozzle 27 of the die 26.

Figure 13:
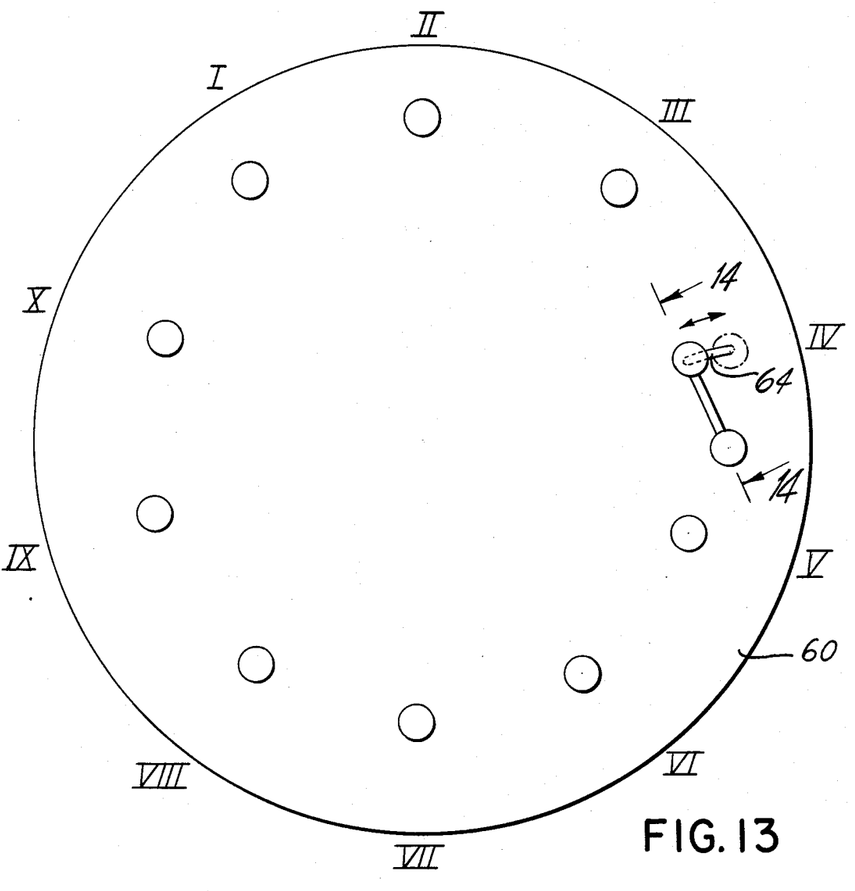
FIG. 13 is a schematic plan view illustrating the ten stations of the rotatable table on which the mandrel, carrying the inner mold piece, and the outer mold piece are mounted for movement form station to station.

With particular reference to FIGS. 13 and 14, a rotatable work table 60 intermittently rotates through ten stations. There are ten mandrels 62 so that at each station a mandrel is available. Each mandrel 62 carries a sleeve 68 to hold a cylindrical sidewall 22 (that is, tube body). An inner mold piece 34 is positioned at the top of each mandrel 62. In addition, there are ten outer mold pieces 36 mounted to the table, one spaced above each mandrel. Each of the outer mold pieces 36 is positioned above the mandrel 62 and is movable between an up position spaced from the inner mold piece and a down position which engages the inner mold piece 34 to form the mold cavity within which the plastic head is formed.

In order for various operations, other than the actual molding operation employing the outer mold piece, to be performed the mandrel 62 is moved along a track 64 from an inboard to an outboard position. The ten work stations and the position of the mandrel at each of these stations is as follows:

I. At a first work station, with the mandrel 62 in the outboard position, the flexible cylindrical squeeze tube body 22 is loaded onto the mandrel 62. This loading technique is known in the art and thus is not described herein.

II. At the second station, with the mandrel still in the outboard position, the mandrel 62 is under the extruder which extrudes an annulus of plastic that is wiped off the extruder nozzle 27 and drops onto the inner mold piece 34.

III. The mandrel 62 swings inboard along track 64 between stations II and III so that at station III it is under the corresponding outer mold piece 36. The outer mold piece 36 descends to form the mold cavity and mold the plastic into the molded head.

IV through VII. As the molded head indexes from station III through station IV, V, VI, and VII and then to station VIII, it cools as coolant is passed through the coolant jacket 44 in the outer mold piece 36. During this cooling sequence, the mandrel 62 stays at its inboard position.

VIII. At station VIII, with the mandrel 62 still in its inboard position, the outer mold 36 is retracted by a rotational and withdrawing motion. The rotational motion is required so that the outer mold piece 36 can be unthreaded from the threads that have been molded onto the neck of the head.

IX. The mandrel 62 then swings along track 64 to its outboard position at station IX where a cap is threaded onto the molded head by a technique known in this art.

X. Finally, with the mandrel 62 still in the outboard position, the tube having sidewall, molded head and cap is ejected at station X.

Figure 15:
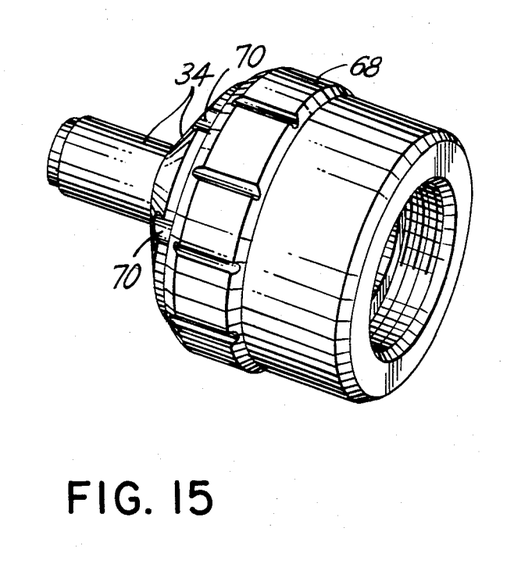
FIG. 15 illustrates the set of indentations on the inner mold piece which serves to hold the molded head from rotation relative to the mandrel once the molding operation is completed and thus facilitate the capping steps.

As shown in FIG. 15, the inner mold piece 34 has a series of six peripheral indentations 70. These indentations cause the inner surface of the head to be molded with six corresponding protrusions. As a consequence, when the molding of the head is completed, the inner mold piece 34 will hold the head 24 against rotational movement so that the operations at stations VIII and IX can be achieved without requiring a tight and possibly damaging grip on the sidewall 22. In particular, the mating between the indentations 70 and molded head hold the tube against the rotational torque developed when placing a cap on the molded head at station IX.

Figure 16:
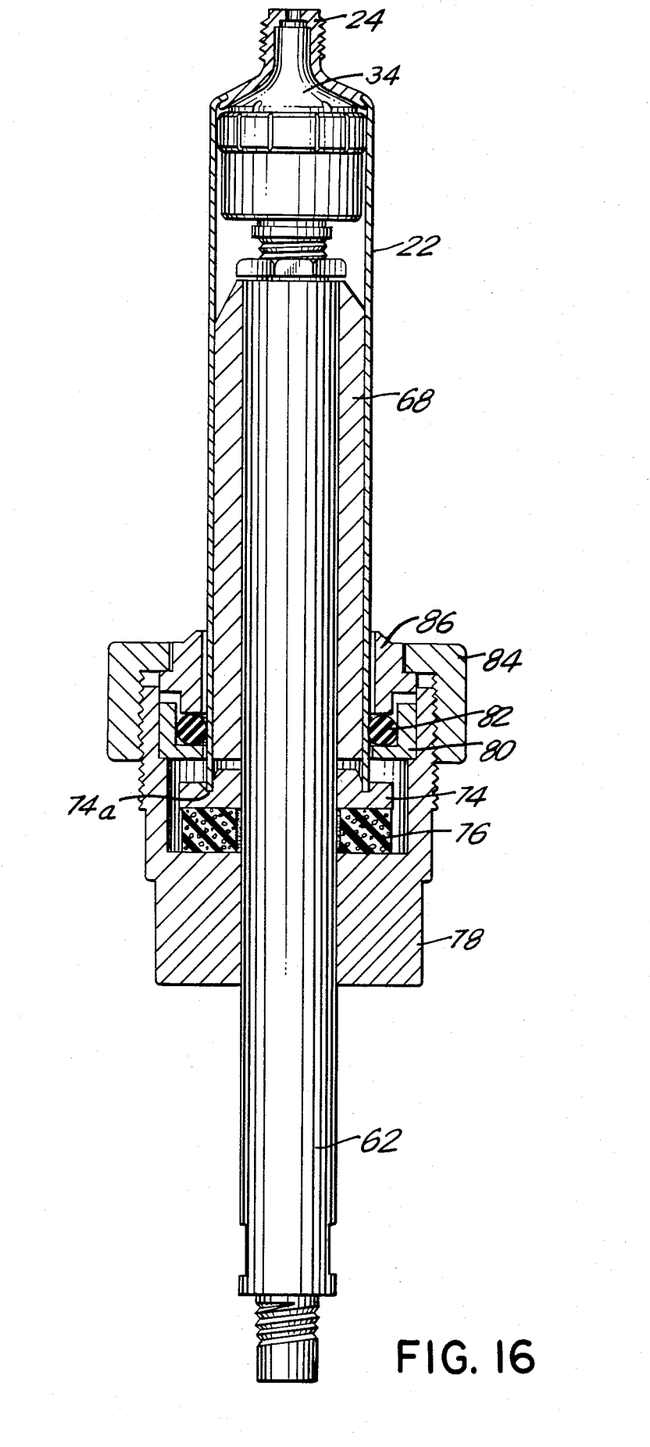
FIG. 16 is a sectional view similar to that of FIG. 14 but on a larger scale showing only the mandrel and the positioning and holding equipment associated with the mandrel.

The arrangement shown in FIG. 15 keeps the molded head 24, and attached sidewall 22, from rotating axially during such steps as removal of the outer mold piece and threading of the cap. The arrangement shown in FIG. 16 aids in positioning the sidewall 22 during the molding operation, and also serves to permit the sidewall 22 to be readily assembled onto the mandrel 62 at station I yet holds the sidewall 22 against axial forces that tend to move the sidewall up on the mandrel 62. A sleeve 68 is mounted on the mandrel 62. The sleeve 68 is selected to have an outer diameter that provides essentially a slip fit relationship with the sidewall 22. Thus the sleeve 68 permits the sidewall 22 to be readily passed onto the mandrel 62 yet holds the sidewall in position so that the axis of the mandrel 62 is substantially the axis of the sidewall. An annular seat member 74 made of a plastic material is mounted on the mandrel 62 immediately below the sleeve 68. A foam rubber annulus 76 mounted on the mandrel 62 supports the seat 74. With the sidewall 22 removed, this resilient support member 76 holds the seat 74 against the sleeve 68. The groove 74a in the seat 74 receives the bottom end of the sidewall 22. When the outer mold piece 36 is moved down it engages the upper end of the sidewall 22 and pushes the sidewall 22 down by about 0.3 cm. The seat member 74 travels down a comparable amount against the highly compressible foam rubber support 76 to provide the condition shown in FIG. 16. A fixed member 78 is affixed to the mandrel 62 and provides, not only the base for the foam rubber element 76, but also supports an annular bushing 80, within which an O-ring 82 is held. A manually operable threaded cap 84 is threaded onto the fixed support member 78. As the cap 84 is rotated, it moves axially to direct the pusher ring 86 against the O-ring 82 with more or less force. In this fashion, the O-ring 82 is distended to become slightly oval in cross-section, and to provide more or less friction between the O-ring 82 and the sidewall 22. The cap 84 is manually adjusted so taht the friction between the O-ring 82 and sidewall 22 is low enough that the sidewall 22 can be readily mounted onto the sleeve 68 during the loading operation at station I. However, the frictional engagement is sufficiently great so that the relatively small axial forces that will operate on the sidewall 22 during the various stages will be resisted and the sidewall 22 will stay in place. In this fashion, the arrangement shown in FIG. 16 provides a predetermined amount of O-ring 82 pressure to hold the sidewall 22 from axial movement while the notches 70 shown in FIG. 15 serve to hold the molded head, and thus the sidewall 22, from rotational movement.

What is claimed is:

1. In a machine for molding a plastic head onto a cylindrical body, the improvement in an extruder for extruding the plastic material that is to be formed into the head comprising:
    a nozzle having outlet ports, the plastic extruded from said ports positioning itself on said nozzle,
    a chilled wiper member movable along said nozzle between a retracted position on one side of said ports and a protracted position at the outer end of said nozzle on the other side of said ports, said wiper when moving from said retracted position to said protracted position wiping off whatever plastic material has been extruded through said ports.

2. The improvement of claim 1 wherein said wiper is an annulus positioned around said nozzle and having a spaced relationship to said nozzle with sufficient clearance to avoid contact between said wiper and said nozzle as said wiper moves relative to said nozzle.

3. In a machine for molding a plastic head onto a cylindrical body, the improvement comprising:
    the extruder of claim 2, and
    a mandrel positioned below said nozzle of said extruder,
    said mandrel having a sleeve adapted to hold the cylindrical body,
    the upper surface of said mandrel defining the inner surface of the mold that is to form the molded plastic head,
    the plastic material wiped off the nozzle by said wiper dropping onto said inner mold surface.

4. Improvement of claim 3 further comprising:
    first positioning means for positioning and holding the cylindrical body in a raised position, forming a circular trough between the upper portion of said body and said inner mold member for receipt of the plastic material wiped off of said nozzle by said wiper, and
    means for moving said cylindrical body down from said raised position to a mold position during the molding operation.

5. In a die for extruding a hot plastic material from an exit port at an end of the die to form an annulus of plastic material, the improvement comprising:
    a cooled wiper member movable across said end of said die to wipe off whatever annulus of plastic material is formed on said end of said die.

* * * * *